(12) United States Patent
Hall

(10) Patent No.: US 7,322,559 B2
(45) Date of Patent: Jan. 29, 2008

(54) PLUG VALVE HAVING HIGH FLOW RESOLUTION

(75) Inventor: Ola Hall, Nykvarn (SE)

(73) Assignee: Scania CV AB (Publ) (SE)

( * ) Notice: Subject to any disclaimer, the term of this patent is extended or adjusted under 35 U.S.C. 154(b) by 255 days.

(21) Appl. No.: 11/047,217

(22) Filed: Jan. 31, 2005

(65) Prior Publication Data

US 2005/0166964 A1    Aug. 4, 2005

(30) Foreign Application Priority Data

Jan. 30, 2004    (SE) .................................... 0400188

(51) Int. Cl.
*F16K 5/10*    (2006.01)
(52) U.S. Cl. ...................... 251/121; 251/209
(58) Field of Classification Search ........ 251/208–209, 251/121, 309–312
See application file for complete search history.

(56) References Cited

U.S. PATENT DOCUMENTS

| | | | | |
|---|---|---|---|---|
| 766,697 A | * | 8/1904 | Hummell | 251/208 |
| 3,308,850 A | * | 3/1967 | Gill | 251/183 |
| 3,773,291 A | * | 11/1973 | Grauer | 251/315.04 |
| 4,131,128 A | * | 12/1978 | Gotzenberger | 137/556 |
| 4,262,880 A | * | 4/1981 | Danko et al. | 251/288 |
| 4,699,358 A | * | 10/1987 | Iqbal | 251/209 |
| 4,881,718 A | * | 11/1989 | Champagne | 251/209 |
| 5,108,075 A | * | 4/1992 | Downard et al. | 251/209 |
| 5,349,983 A | * | 9/1994 | Ozarowski et al. | 251/312 |
| 5,524,863 A | * | 6/1996 | Davis | 251/127 |
| 5,551,467 A | * | 9/1996 | Booth et al. | 137/1 |
| 6,109,591 A | * | 8/2000 | Tuttle et al. | 251/208 |
| 6,520,481 B2 | * | 2/2003 | Harneit | 251/207 |
| 6,863,257 B2 | * | 3/2005 | Home | 251/209 |
| 2001/0030309 A1 | * | 10/2001 | Carlson et al. | 251/209 |

FOREIGN PATENT DOCUMENTS

| | | |
|---|---|---|
| DE | 1033981 | 7/1958 |
| DE | 2748734 | 10/1979 |
| FR | 2432122 | 2/1980 |

* cited by examiner

*Primary Examiner*—John Bastianelli
(74) *Attorney, Agent, or Firm*—Ostrolenk, Faber, Gerb & Soffen, LLP

(57) ABSTRACT

The invention relates to a valve with high flow resolution within a flow range, which valve comprises a valve housing and a valve plug, whereby the valve plug comprises a cavity and a flow regulating slit which in cooperation with the valve housing forms a flow passage. On the shell surface of the valve plug, when the valve is in a fully open position, there is an area which, relative to the outlet of the valve housing, is situated on the other side of the axis of rotation of the valve plug, which area is free from the cavity. The intersection of the cavity with the shell surface of the valve plug is preferably situated on the one side of the axis of rotation of the valve plug so that the valve plug exhibits a continuous shell surface free from the cavity along at least 180 degrees of the circumference of the valve plug, whereby the flow regulating slit may extend over a substantial portion of the circumference of the valve plug, thereby providing good flow resolution in the flow range in which the flow enters the cavity via the flow regulating slit only.

15 Claims, 3 Drawing Sheets

PLUG VALVE HAVING HIGH FLOW RESOLUTION

CROSS-REFERENCE TO RELATED APPLICATION

This application is based on and claims priority to Swedish Patent Application No. 0400188-9, filed on Jan. 30, 2004.

BACKGROUND OF THE INVENTION

The present invention relates to a valve with high flow resolution within a flow range, which valve comprises a valve housing and a valve plug with a flow regulating slit.

For setting the temperature in a driver's space or passenger space in a vehicle it is possible to use, for example, a rotary valve regulating the flow of hot water through a heat exchanger. The valve may be set either manually or automatically.

In a known valve comprising a valve plug with a flow regulating slit, the valve plug's inlet is arranged centrally relative to the valve plug's outlet and they are connected to one another via a channel which passes through the center of the valve plug, whereby the flow path when the valve is fully open is along a straight line through the valve plug. Turning the valve plug through approximately 90-100 degrees closes the valve. Further turning reopens the valve. In such cases turning the valve from fully open to fully closed position involves a travel distance of about 90-100 degrees. The flow regulating slit is arranged at the portion of the travel distance which does not comprise the inlet to the cavity through the valve plug, i.e. usually along approximately 30 degrees of the valve plug's periphery.

To enable the valve to be fully closed there needs to be on the shell surface of the valve plug a vacant area at least as large as the valve plug's inlet. A case where the inlet extends across 30 degrees of the shell surface will thus require 30 degrees of the shell surface in order to achieve a fully closed valve, thus leaving approximately 30 remaining degrees of the shell surface to cater for manufacturing tolerances. This makes it difficult in practice to arrange a flow regulating slit which extends across more than 45 degrees of the shell surface.

A problem with previously known valves is that their flow resolution, i.e. the change in flow per angle unit of rotation of the valve plug, is relatively low, which makes it difficult to set the right flow of hot cooling water from the vehicle's engine through the heat exchanger, which flow determines the temperature of the air flowing out from the heat exchanger. It is at low hot water flow through the heat exchanger that it is desirable to increase the region of high flow resolution. In the case of automatically operated valves, the difficulty in setting the right temperature results in the valve moving violently to and for, which may lead to premature failure of the valve. In the case of manually set table valves, the driver has to turn the valve plug to and for with great precision in order to achieve the desired temperature.

SUMMARY OF THE INVENTION

The problem of insufficiently high flow resolution is solved according to the invention by arranging a valve which comprises a valve housing and a valve plug, whereby the valve plug comprises a cavity and a flow regulating slit which in cooperation with the valve housing forms a flow passage, and whereby there is on the valve plug's shell surface, when the valve is in a fully open position, an area which, relative to the valve housing outlet, is situated on the other side of the axis of rotation of the valve plug, which area is free from the cavity, so that the valve plug exhibits a long continuous shell surface free from the cavity.

The valve comprising the characteristics of the invention provides the advantage of making high flow resolution possible within a desired flow region. Premature failure of the valve after recurrent opening and closing is thus prevented. Further advantages are that setting the right temperature manually is much easier and that in the case of automatic setting fewer control actions are needed, thereby lengthening the service life of the system.

BRIEF DESCRIPTION OF THE DRAWINGS

The invention is explained in more detail below with reference to the attached drawings, in which.

DESCRIPTION OF THE PREFERRED EMBODIMENTS

Figure 1:
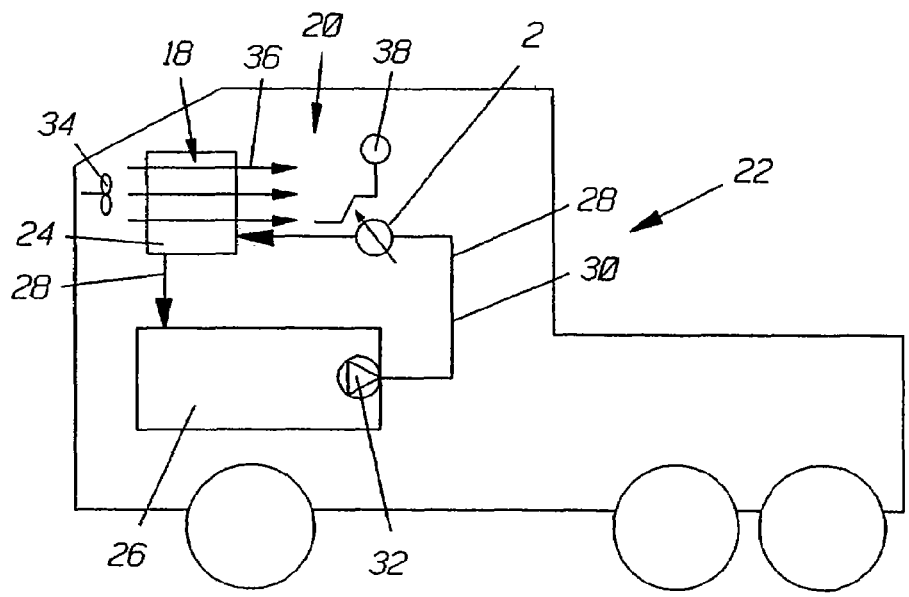
FIG. 1 depicts schematically a heating system for a driver's cab in a vehicle.

The same reference notations throughout are used below for the same characteristics in the various drawings.

The present invention relates to a valve 2 with high flow resolution within a flow range, which valve 2 comprises a valve housing 4 and a valve plug 6, whereby the valve plug 6 comprises a cavity 8 and a flow regulating slit 10 which, in cooperation with the valve housing 4, forms a flow passage. On the shell surface 16 of the valve plug 6, when the valve 2 is in a fully open position, there is an area 50 which, relative to the outlet 15 of the valve housing 4, is situated on the other side of the axis of rotation C of the valve plug 6, which area 50 is free from the cavity 8. The intersection of the cavity 8 with the shell surface of the valve plug 6 is preferably situated on the one side of the axis of rotation C of the valve plug 6, e.g. due to the outlet 12 of the cavity 8, when the valve is in a fully open position, being angled relative to the inlet 14 of the cavity 8, i.e. due to the centerline A of the outlet of the valve plug 6, when the valve is in a fully open position, being not parallel with the centerline B of the inlet of the valve plug 6, so that the valve plug 6 exhibits a continuous shell surface 16 which is free from the cavity 8 along at least 180 degrees of the circumference of the valve plug 6. The flow regulating slit 10 may extend over the portion of that surface which is not needed for ensuring closure of the valve, thereby providing high flow resolution in the flow range in which the flow leaves the cavity 8 via the flow regulating slit 10 only. In the case of a valve where 30 degrees of the shell surface are required for ensuring closure of the valve, the flow regulating slit may, instead of 30 degrees, extend 120 degrees along the valve plug's shell surface without affecting the portion of the shell surface which caters for manufacturing tolerances.

FIG. 1 depicts schematically a heating system 18 for a driver's cab 20 in a vehicle 22. The heating system 18 comprises inter alia a heat exchanger 24 connected to the engine 26 of the vehicle 22 via a pipe system 28 in such a way that the cooling water 30 of the engine 26 is led from the engine 26 through the heat exchanger 24 and back to the engine 26. A pump 32 circulates the cooling water 30 in the pipe system 28. In addition, a valve 2 is arranged in the pipe system 28, preferably upstream from the heat exchanger 24, to determine the flow velocity of the cooling water 30 through the heat exchanger 24. A fan 34 is also arranged to blow air 36 through the heat exchanger 24 in such a way that the hot cooling water 30 heats the air 36 and that the air 36 leaving the heat exchanger 24 is blown into the driver's cab 20 of the vehicle 22. The fact that the valve 2 in the pipe system 28 can be operated from the driver's cab 20 of the vehicle 22 enables a person 38 in the driver's cab 20 to set a desired temperature for the air 36 leaving the heat exchanger 24, either manually by means of a knob or automatically by means of a control system.

Figures 2, 3, 4:
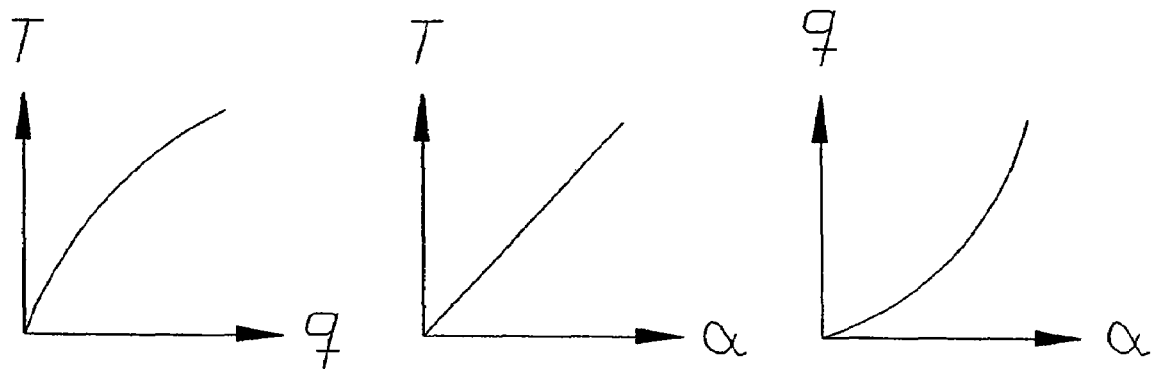
FIG. 2 depicts schematically a diagram representing the relationship between cooling water temperature through the heat exchanger and the cooling water flow through the heat exchanger.
FIG. 3 depicts schematically a diagram representing the preferred relationship between the aperture angle of the valve plug and the temperature of the air leaving the heat exchanger.
FIG. 4 depicts schematically a diagram representing the relationship between the aperture angle of the valve plug and the flow of hot air through the heat exchanger which is required for achieving the preferred relationship depicted in FIG. 3.

FIG. 2 depicts schematically a diagram representing the relationship between the cooling water flow q through the heat exchanger 24 and the temperature T of the air leaving the heat exchanger 24. The diagram shows that this ratio is non-linear in that the increase in the temperature T of the air leaving the heat exchanger 24 declines with increasing flow q through the heat exchanger 24.

FIG. 3 depicts schematically a diagram representing the preferred relationship between the aperture angle a in degrees of the valve plug 6 and the temperature T in ° C. of the air 36 leaving the heat exchanger 24. It is desirable that this relationship should be linear, i.e. that a certain number of degrees of change in the aperture angle α of the valve plug 6 should match with a certain number of ° C. of change in the temperature of the air 36 leaving the heat exchanger 24.

FIG. 4 depicts schematically a diagram representing the relationship between the aperture angle a of the valve plug 6 and the flow q of cooling water 30 through the heat exchanger 24 which is required for achieving the preferred relationship depicted in FIG. 3. The first part of the curve represents the flow region (and hence indirectly the temperature region of the air 36 leaving the heat exchanger 24) in which high flow resolution (i.e. accurate control of the temperature of the air 36 leaving the heat exchanger 24) is desirable.

Figure 5:
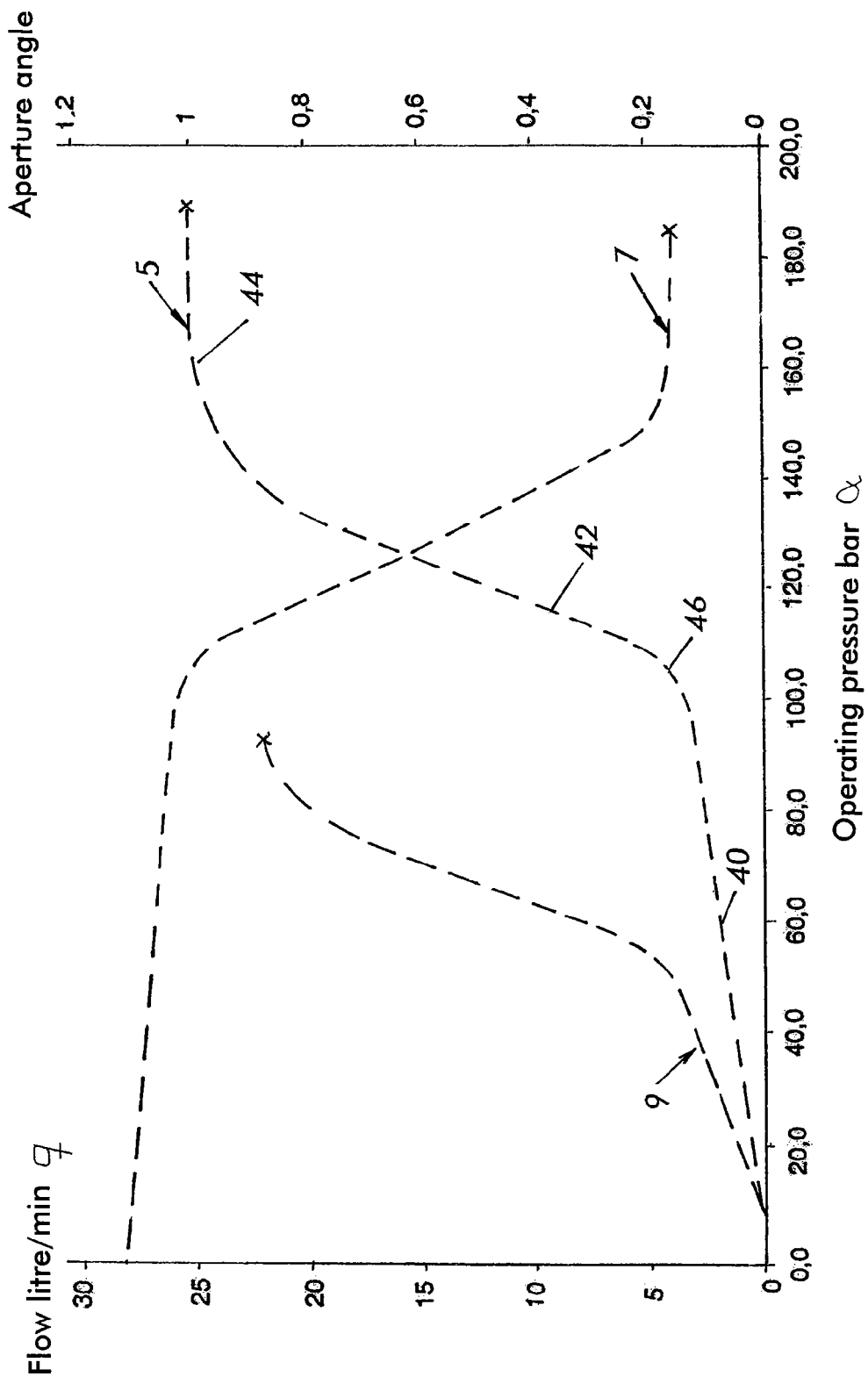
FIG. 5 depicts a diagram representing the relationship between the aperture angle of the valve plug and the flow of hot air through the heat exchanger in the case of a valve according to an embodiment of the invention.

FIG. 5 depicts a diagram with a curve 5 representing the ratio between the aperture angle α of the valve plug 6 and the flow q of cooling water 30 through the heat exchanger 24 in the case of a valve 2 according to an embodiment of the invention, i.e. the same relationship as schematically depicted in the diagram in FIG. 4. It shows that the diagram is divisible into three main parts: a first part 40 representing the flow region in which the flow resolution is high and the flow leaving the valve plug 6 emerges via the flow regulating slit 10, a second part 42 in which the flow resolution is low and the flow leaving the valve plug 6 mainly emerges via the outlet 12 to the cavity 8 of the valve plug 6, and a third part 44 where the flow resolution is again high because, relatively speaking, further rotation of the valve plug 6 causes no great enlargement of the active outlet area 12 of the valve plug 6. The operating pressure 7 across the outlet 12 for the cavity 8 of the valve plug also appears in the diagram. The diagram also shows, by way of comparison, a curve 9 representing the previously known valve described above, which curve 9 is likewise divisible into three parts. This curve is much steeper at low flows than the curve representing the valve 2 according to the present invention. It may thus be seen that the flow resolution is higher with the valve plug according to the invention. The flow through the valve 2 increases with increasing cross-sectional area of the passage between the valve housing 4 and the valve plug 6. The dimensions of the flow regulating slit 10 determine the position of the "bend" 46 between the first part 40 and the second part 42 of the curve 5, whereby the longer the flow regulating slit 10, the further to the right the bend 46 occurs. The change in the cross-sectional area of the flow regulating slit 10 per angle unit determines the gradient of the first part 40 of the curve 5, whereby the smaller the change the smaller the gradient. The cross section determines the flow.

Figures 6, 8:
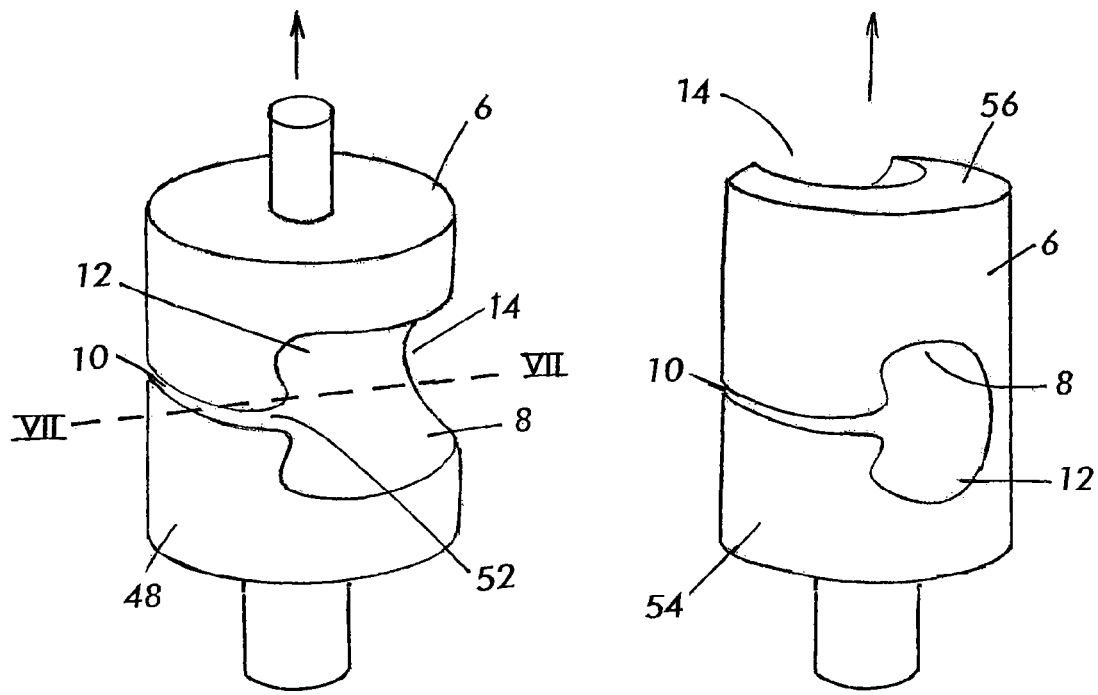
FIG. 6 depicts the valve plug used in the valve represented in FIG. 5.
FIG. 8 depicts schematically an alternative embodiment of a valve plug according to the invention.

FIG. 6 depicts the valve plug 6 used in the valve 2 according to the invention which is represented in FIG. 5. The valve plug 6 rotates in the valve housing 4 about an axis C between open and closed positions of the valve 2. FIG. 6 shows the cavity 8 situated on the one side of the axis of rotation C of the valve plug 6 because in this embodiment, when the valve is in a fully open position, the outlet 12 in the cavity 8 of the valve plug 6 and the inlet 14 in the cavity 8 of the valve plug 6 are not in line through the center of the valve plug 6 but are angled, i.e. defining an acute angle with the axis C, resulting in the valve plug 6 having a large shell surface 48 which can exhibit a long flow regulating slit 10 beyond the planar shell area required for closing of the valve 2. The travel distance for the valve 2 according to this embodiment depicted is approximately 180 degrees, as may also be seen in the diagram in FIG. 5. FIG. 6 also shows that when the valve is in a fully open position the outlet 12 of the cavity 8 in the valve plug 6 is constricted, i.e. partly narrowed towards the center of the outlet 12, thereby enabling the flow regulating slit 10 to be narrowed somewhat towards the center of the outlet 12 and hence making it possible for the length of the flow regulating slit 10 to be increased further. A larger diameter of the valve plug 6 or a reduced cross-sectional area, when the valve is in a fully open position, of the outlet 12 of the cavity 8 results in space for a longer flow regulating slit 10, but also results in a larger valve 2 or a smaller maximum flow through the valve 2.

Figure 7:
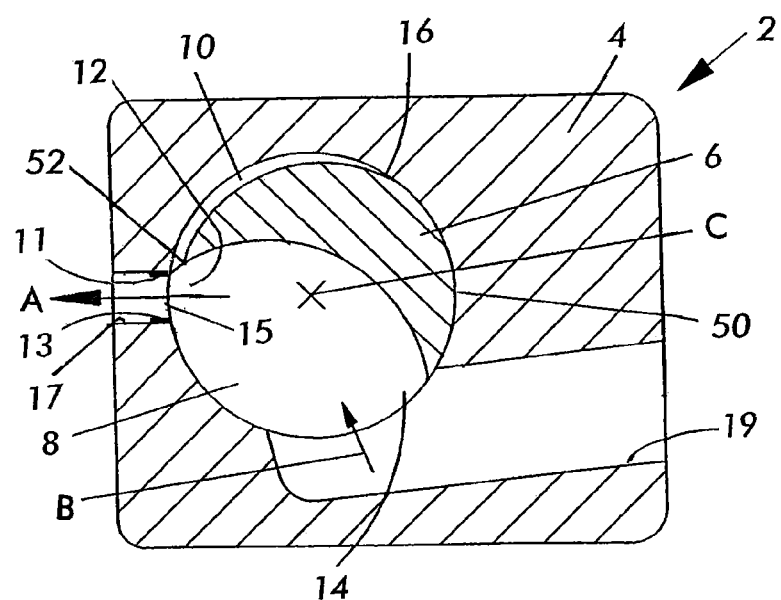
FIG. 7 depicts a section along the line VII-VII through the valve of FIG. 6 accommodated in a valve housing.

FIG. 7 depicts a section along the line VII-VII through the valve plug 6 in FIG. 6 accommodated in a valve housing 4, when the valve 2 is in a fully open position. As shown, the valve housing 4 includes a valve housing inlet 19 and a valve housing outlet 17 for allowing a flow of fluid there through. The flow through the valve 2 increases with increasing cross-sectional area of the passage between the valve housing 4 and the valve plug 6. High flow through the valve 2 is thus achieved when the bulk of the flow bypasses the flow regulating slit 10 by passing straight out from the cavity 8 as shown in the drawing. Turning the valve plug 6 in the valve housing 4 anticlockwise about the axis C closes the valve 2. High flow resolution is achieved in the flow range (approximately 90 degrees in the embodiment depicted) in which the flow leaves the cavity 8 via the flow regulating slit 10 only, i.e. after the valve plug 6 has been turned a number of degrees anticlockwise about the axis C. FIGS. 6 and 7 show that the flow regulating slit 10 has a varying cross-sectional area whereby the cross-sectional area is greatest at the end 52 of the flow regulating slit 10, the end nearest to the cavity 8 of the valve plug 6, and whereby the cross-sectional area of the flow regulating slit 10 decreases along the flow regulating slit 10 in a direction away from the cavity 8, resulting in flow through the valve 2 being progressively smaller the further the valve plug 6 is turned anticlockwise from an open to a closed position. Here the fit between the valve plug 6 and the valve housing 4 is so good that no leakage between them can occur. Alternatively, the valve plug 6 and valve housing 4 may have a clearance between them, in which case seals 11, 13 will be arranged to prevent flow leakage when the valve is closed. The drawing also shows the planar shell area 50 required for closing of the valve 2.

FIG. 8 depicts schematically an alternative embodiment of a valve plug 6 according to the invention. In this valve plug 6 the inlet 14 of the cavity 8 in the valve plug 6 is angled, relative to the outlet 12 of the cavity 8, in the direction of the axis of rotation C of the valve plug 6, resulting in a still larger shell surface 54 free from the cavity 8 and hence also more space for the flow regulating slit 10 on the shell surface 54 of the valve plug 6, due to the inlet 14 of the cavity 8 in the valve plug 6 being arranged on the top surface 56 of the valve plug 6 instead of on the latter's shell surface 54. In this embodiment the travel distance can thus be increased further. As a portion of the shell surface of the valve plug 6 has to be free from the cavity 8 and the flow regulating slit 10 for it to be possible to close the valve 2, the slit may be arranged across up to 360 degrees minus the extent of the cavity along the shell surface and minus tolerance-absorbing shell surface.

The scope of invention is not limited to the preferred embodiment only, but is determined by the claims set out below. Thus, for example, the cross-sectional shape of the cavity may differ from that shown in the drawings, e.g. by the cavity having the shape of a straight cylinder not passing through the centre of the valve plug, by the length and shape of the flow regulating slit differing from what is shown in the drawings, e.g. by being longer or undulating or set obliquely in the axial direction of the valve plug instead of being straight, and by the shape of the valve plug differing from that shown in the drawings, e.g. by being substantially spherical instead of substantially cylindrical. In the preferred embodiment of the invention, the valve is arranged to regulate heating of a driver's cab in a vehicle. It is also possible for the heated space to be another space, e.g. a combined driver's and passenger space in a vehicle, as in a car, bus or truck.

What is claimed is:

1. A valve with high resolution within a flow range, the valve comprising:
    a valve plug having a shell surface defining a substantially cylindrical shape;
    a valve housing including an open region defined by an interior surface of the valve housing, the open region being shaped for receiving the valve plug and for enabling the valve plug to rotate in the open region, the open region having a radial fluid inlet for admitting a regulated flow of fluid thereto and a radial fluid outlet for expelling a regulated flow of fluid therefrom, the radial fluid outlet being spaced at an angle from the radial fluid inlet such that an axis of the radial fluid outlet is inclined with respect to an axis of the radial fluid inlet;
    the valve plug being disposed in the open region of the valve housing and being shaped so as to be able to rotate in the open region around a rotation axis of the valve plug, the valve plug having a cavity defined in the plug and disposed on one side thereof such that the cavity can communicate with either or both of the inlet and the outlet of the housing dependent on the rotative position of the valve plug in the valve housing, the valve plug having a shell surface defining the valve plug, the shell surface cooperating with the interior surface of the open region to regulate fluid flow and having a first sealing area and a second sealing area, the first and second sealing areas together extending along at least 180 degrees of a circumference of the valve plug;
    a flow regulating slit formed in the second sealing area of the shell surface and communicating with the cavity and which in cooperation with the valve housing forms a flow passage,
    wherein, when the valve plug is in a fully open position, the radial fluid inlet and the radial fluid outlet are located within the cavity of the valve plug and the first sealing area of the shell surface of the valve plug is situated opposite from the radial fluid outlet with respect to the axis of rotation of the valve plug, and wherein, when the valve plug is in a fully closed position, the radial fluid inlet and the radial fluid outlet both face the first sealing area and the second sealing area of the shell surface.

2. A valve according to claim 1, wherein the cavity of the valve plug has an outlet that is constricted and partly narrowed toward a center of the outlet from the cavity, whereby the flow regulating slit is narrowed somewhat towards the center of the outlet from the cavity enabling lengthening of the flow regulating slit.

3. A valve according to claim 1, wherein a cross-sectional area of the flow regulating slit of the valve plug is greatest at an end of the flow regulating slit which is nearest to the cavity of the valve plug and decreases along a length of the flow regulating slit.

4. A valve according to claim 1, wherein the travel distance of the valve plug is at least 120 degrees by rotating the valve plug.

5. A valve according to claim 1, wherein when the valve is in a fully open position, the outlet of the cavity is angled approximately 90 degrees relative to the inlet of the cavity and transversely to the axis of rotation of the valve plug.

6. A valve according to claim 1, wherein the inlet and the outlet are so placed that when the valve is in a fully open position, the inlet of the cavity is angled approximately 90 degrees relative to the outlet of the cavity along the axis of rotation of the valve plug.

7. A valve according to claim 1, wherein the valve is operable either manually or by an automatic control.

8. A valve according to claim 1, wherein the valve plug shell surface is round and the interior surface of the cavity is round.

9. A valve according to claim 8, wherein the valve plug is shaped and sized so that the shell surface forms a seal against the interior surface.

10. A valve according to claim 1, wherein the flow regulating slit narrows as the flow regulating slit extends in a direction away from the cavity.

11. A valve according to claim 1, wherein the cavity and the flow regulating slit are situated such that a cross section of the valve plug forms a crescent shaped area lying on one side of the rotation axis, the crescent shaped area having first and second ends, the first end of the crescent shaped area corresponding with the first end of the flow regulating slit such that when the valve plug is inserted into the valve housing, the flow passage is formed between the flow regulating slit and an adjacent part of the interior surface of the open region.

12. A valve with high resolution within a flow range, the valve comprising:
- a valve plug having a shell surface defining a substantially cylindrical shape, and an axis;
- a cavity disposed in the shell surface on one side of the valve plug, the cavity having a first end and a second end, the cavity having a pair of substantially parallel sides;
- a flow regulating slit disposed in the shell surface of the valve plug, the flow regulating slit having a first end and an opposing second end, the first end of the flow regulating slit communicating with the first end of the cavity; and
- a valve housing including an open region defined by an interior surface, the interior surface having a substantially cylindrical shape for receiving the valve plug and for enabling the valve plug to rotate about the axis of the valve plug, the interior surface of the open region having a radial fluid inlet for admitting a regulated flow of fluid thereto and a radial fluid outlet for expelling a regulated flow of fluid therefrom spaced apart from the radial fluid inlet such that an axis of the radial fluid outlet is inclined with respect to an axis of the radial fluid inlet, the cavity and the flow regulating slit are situated such that a cross section of the valve plug forms a crescent shaped area substantially lying on one side of the axis of the valve plug, the crescent shaped area having first and second ends, the first end of the crescent shaped area corresponding with the first end of the flow regulating slit such that when the valve plug is inserted into the valve housing, a first channel is formed between the flow regulating slit and an adjacent part of the interior surface of the valve housing, wherein when the valve plug is in a fully open position, the radial fluid inlet and the radial fluid outlet are located within the cavity of the valve plug, and wherein, when the valve plug is in a fully closed position, the radial fluid inlet and the radial fluid outlet both face an outer surface of the crescent shaped area.

13. A valve according to claim 12, wherein the first end of the crescent shaped area is separated from the interior surface of the valve housing by the first channel, and the second end of the crescent shaped area can form a seal against the interior surface of the valve housing depending upon the rotative position of the valve plug relative to the valve housing.

14. A valve according to claim 12, wherein the first end of the cavity narrows so that the length of the flow regulating slit can be increased.

15. A valve according to claim 12, wherein the first end of the crescent shaped area is closer to the axis of the valve plug than the second end of the crescent shaped area.

* * * * *